455/6

EXAMINER

51

Nov. 28, 1950 W. J. JONES 2,531,438

MULTIPLE DISTRIBUTION RADIO RECEIVING SYSTEM

Filed March 21, 1947 2 Sheets-Sheet 1

INVENTOR.
WILLIAM J. JONES

BY William D. Hall
Attorney

EXAMIN

Nov. 28, 1950 W. J. JONES 2,531,438

MULTIPLE DISTRIBUTION RADIO RECEIVING SYSTEM

Filed March 21, 1947 2 Sheets-Sheet 2

INVENTOR.
WILLIAM J. JONES

BY William D. Hall
Attorney

EXAMINE

Patented Nov. 28, 1950 2,531,438

UNITED STATES PATENT OFFICE 2,531,438

MULTIPLE DISTRIBUTION RADIO RECEIVING SYSTEM

William J. Jones, Fair Haven, N. J.

Application March 21, 1947, Serial No. 736,184

16 Claims. (Cl. 250—9)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to radio receiving systems for television, frequency modulation and other high frequency signals, and it is more particularly directed to multiple distribution receiving systems adapted for the reception by one or more receivers of signals emanating from one or more transmitting stations, said receivers being collectively coupled to an antenna means by a common transmission line.

Existing multiple distribution receiving systems for television signals or other forms of high frequency transmission are designed so that a plurality of receivers may be installed at a particular location, the respective receivers operating independently of each other and serving to detect signals originating from a plurality of transmitters situated at different points and operating within different frequency channels. In one conventional signal distribution arrangement, in order to obviate the need for a distinct receiving antenna for each receiver in the system, the several receivers are associated with a single all wave omni-directional antenna through a common transmission line. In another known arrangement entailing the use of a group of directional antennas, each antenna being designed and oriented for optimum reception of a particular radio frequency signal arriving from a particular direction, the antennas in the group are collectively coupled to a plurality of receivers by a common transmission line. This group antenna arrangement is advantageous in that it avoids the low signal to noise ratio and multiple path reception inherent in a single all wave omni-directional antenna installation.

Various problems arise in connection with multiple distribution receiving systems wherein a common transmission line serves to link a single or a group of antennas with a plurality of receivers. Among the difficulties encountered are interference and interaction between the individual receivers during their operation, and impedance mismatch between the common transmission line and the various units associated therewith. In a group antenna system wherein the respective antennas are each coupled to the common transmission line through a radio-frequency amplifier, undesirable interaction between the amplifiers in the system is also experienced. These difficulties result in weak, indistinct and distorted reception and are especially deleterious to successful television reception where mismatched impedance coupling between the antennas and the receivers gives rise to improper synchronism between the incoming video signals and the receiver image-synchronizer due to the existence of reflections on the line.

One device designed with a view to minimizing the drawbacks experienced in operating a plurality of receivers from a common transmission line is disclosed in the patent to Kallman, No. 2,394,917, issued February 12, 1946. Kallman provides a multiple directional antenna arrangement and a separate amplifier associated with each antenna, the combined output of the amplifiers being fed to a common transmission line either by paralleling of the output electrodes of the amplifiers or by separating their capacities in a matched network. The matched network may be in the form of a simple low-pass filter with a cut-off above the highest received frequency or an M-derived low pass filter adapted to accommodate higher capacitances with a given matching impedance. The network may also take the form of a band pass filter system passing all desired frequencies and accommodating the output electrode capacities as the capacities of the shunt circuits, or an M-derived band pass filter. One end of these filter networks may either be terminated with a matching resistance or be matched to another branch of a transmission system.

The arrangement contemplated by Kallman has been found to suffer from certain serious limitations. A band pass filter, as suggested by Kallman, causes intolerable phase distortion unless composed of a minimum of seven sections including complete bridging of the series impedance arms therein with negative impedance elements. However, a network free from phase distortion is unfeasible inasmuch as the values of the inductance and capacitance that would constitute the impedance arms could not be realized physically at present day television broadcasting frequencies.

Moreover, even assuming that such a network were feasible and could be constructed to accommodate only the desired frequencies, a network of this type woud still be deficient in other essential respects. A band pass network is incapable of discriminating between: (a) the incident energy originally propagated through the transmission line; (b) reflections thereof appearing on the transmission line to an extent depending on the standing wave ratio characteristic of the line; (c) energy resulting from radiation locally generated in the several receivers and fed back into the line. In consequence, emerging from the output of a band pass network associated with the input circuit of a particular receiver will not only be the original signals derived from the antenna but a reflected signal introduced by the transmission line as well as signals locally generated by other receivers coupled to the transmission line. The presence of these undesired signals in a television receiver will act to impair or completely disrupt the operation of the image synchronizer and also will result in the display of multiple images on the receiving screen.

It is not possible with the networks described to govern the direction of propagation of the radio frequency energy delivered by the antenna amplifiers to the line. If an antenna is connected directly to a transmission line or an amplifier is interposed between said antenna and said line, and then the transmission line is terminated at a predetermined point in its characteristic impedance by one network, and other networks are connected at other points along the transmission line, there will exist an impedance mismatch. This mismatch will arise between the transmission line connecting the amplifier or the antenna and said predetermined point, said mismatch being due to the total parallel impedance of the total number of networks connected to the line. There will also be a mismatch between said predetermined point and the other points on the line. If the networks coupling the receiver to the transmission line are made with an extremely high input impedance so that the total shunt impedance is equal to the characteristic impedance of the line, there will still be a mismatch between all of the individual networks, thereby producing multiple reflections.

In view of the foregoing it is the principal object of this invention to provide a multiple distribution receiving system affording clear and distinct high frequency reception, said system including one or more antennas coupled to one or more receivers by a common transmission line. It is also an object of the invention to provide a system of this type wherein interference and interaction between the individual receivers therein is substantially eliminated.

More specifically, it is an object of this invention to provide in a receiving system including one or more antennas coupled through amplifiers to one or more receivers by a common transmission line, directional coupling means serving to govern the direction of propagation of the energy delivered by the antennas to the transmission line, whereby interaction between the respective antenna amplifiers is avoided.

A further object of this invention is to provide in a receiving system means for introducing or extracting energy from a transmission line without phase distortion.

Another object of this invention is to provide directional coupling means for the receivers in a system of the above type, said coupling means being adapted to discriminate between the desired energy originally propagated through the transmission line and reflections thereof on the line. Yet another object of this invention is to provide directional coupling means of simple, and economical construction.

For a better understanding of the invention as well as other objects and further features thereof, reference is had to the following detailed description to be read in connection with the accompanying drawing wherein.

Figures 1, 2, 3, 4, 5, 6, 7:
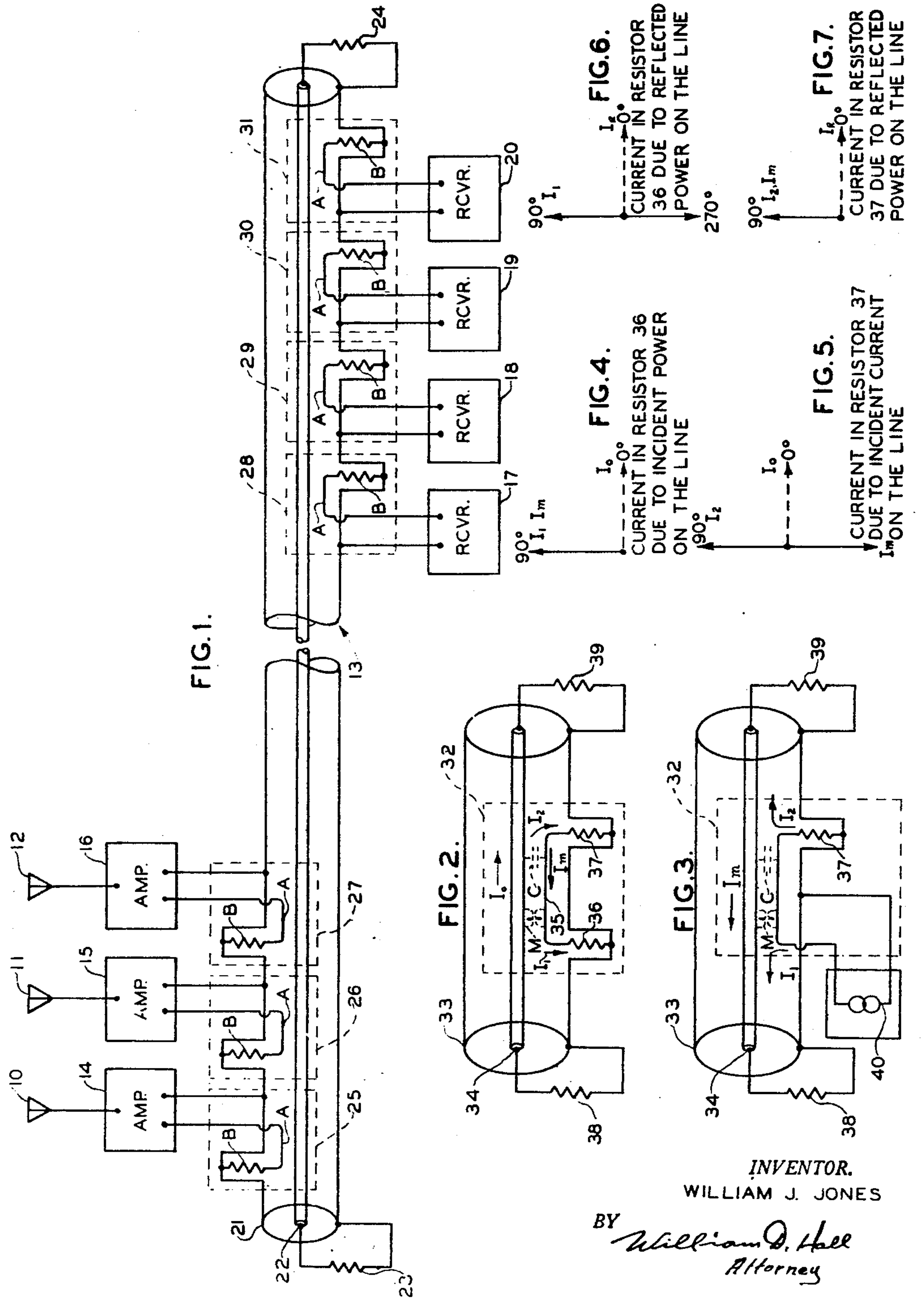
Figure 1 is a block diagram of a preferred embodiment of a receiving system in accordance with the principles underlying the invention.
Figure 2 is a schematic diagram illustrating the theory of operation of a directional coupler incorporated in the system of Fig. 1.
Figure 3 is a schematic diagram showing a modification of the directional coupler in Fig. 2.
Figure 4 is a vector diagram of current flow in one impedance arm of the directional coupler in Fig. 2 as a result of incident energy on the transmission line.
Figure 5 is a vector diagram of current flow in the other impedance arm of the directional coupler in Fig. 2 as a result of incident energy on the line.
Figure 6 is a vector diagram of current flow in one impedance arm of the directional coupler in Fig. 2 as a result of reflected energy on the line.
Figure 7 is a vector diagram of current flow in the other impedance arm of the directional coupler in Fig. 8 as a result of reflected energy on the line.

Referring now to Figure 1, the receiving system is comprised of a plurality of directional antennas 10, 11 and 12, each dimensioned and oriented for optimum signal pick-up from a particular transmitter, said antennas being coupled to a common transmission line 13 through suitable radio frequency amplifiers 14, 15 and 16, respectively. Also coupled to transmission line 13 are a plurality of conventional radio receivers 17, 18, 19 and 20. Transmission line 13 is preferably of the coaxial type having an outer conductor 21 and an inner conductor 22. Transmission line 13 is terminated at one end by a matching impedance 23 and at the other end by a matching impedance 24, said impedances being connected between the outer conductor 21 and the inner conductor 22.

Amplifiers 14 to 16 and receivers 17 to 20 are each coupled to transmission line 13 by identical directional couplers 25 to 31, respectively, the directional couplers being inclosed, for purposes of clarity by dashed line boxes. Directional couplers 25 to 31 each include a coupling probe A, which acts to introduce or derive energy from the transmission line 13, and an impedance B which acts to absorb energy on the line propagated in a direction opposed to the incident energy thereon. The use of directional couplers 25 to 31 serves to substantially eliminate all of the problems resulting from the introduction and removal of radio frequency energy to and from transmission line 13. That is to say, directional couplers 25 to 31 prevent interaction and interference between amplifiers 14 to 16 and receivers 17 to 20.

The theory and behavior of directional couplers 25 to 31 will be set forth in connection with Figure 2 wherein dashed line block 32 encloses a directional coupler, said coupler being incorporated in a coaxial transmission line consisting of an outer conductor 33 and an inner conductor 34. The coaxial transmission line is terminated at both ends in its characteristic impedance by matching impedances 38 and 39.

Directional coupler 32 consists of a probe 35 disposed in proximity to inner conductor 34. Probe 35 is connected at both ends thereof to outer conductor 33 by a pair of impedances 36 and 37. Impedances 36 and 37 are preferably non-inductive resistors so that the values of the impedances are equal to the ohmic value of the resistors. Probe 35 is coupled to inner conductor 34 both capacitively and inductively, C representing the capacity and M the mutual inductance. Mutual inductance M and capacity C are distributed over a very small fraction of a wave length and consequently may be treated as lumped constants. The symbol $I_0$ represents the current of incident energy propagated along the transmission line. The symbols $I_1$ and $I_2$ represent the respective currents which flow in impedances 36 and 37 due to capacitative coupling C, while the symbol $I_m$ represents the current which flows in probe 35 due to the mutual inductive coupling M. The arrows in Fig. 2 indicate the direction of current flow due to incident current $I_0$ on the transmission line.

Directivity is achieved by proper proportioning of the circuit parameters so that the vector relationships represented in Figs. 4 and 5 are attained. Figure 4 indicates the phase of currents in resistor 36 due to incident power on the line, and Fig. 5 indicates the phase of currents in resistor 37 due to said incident power. It will be seen in Fig. 4 that the currents $I_1$ and $I_m$ are both 90° out of phase with respect to $I_0$, hence a voltage drop will be developed across resistor 36 as a function of the power of incident energy on the transmission line. It will be evident from Fig. 5 that in resistor 37 the current $I_2$ is 90° out of phase with $I_0$, while the current $I_m$ is 270° out of phase with $I_0$, hence $I_2$ and $I_m$ are in phase opposition. Since the currents $I_2$ and $I_m$ in resistor 37 are 180° out of phase, by proper adjustment of the circuit parameter these currents can be made of equal intensity whereby no drop will be developed across resistor 37 due to the incident power on the transmission line.

Figures 6 and 7 represent the vector relationships of currents in resistors 36 and 37, respectively, in the event there is a reflected current $I_r$ flowing in the transmission line. As indicated in Fig. 6, the current $I_1$ in resistor 36 due to reflected current $I_r$ will be in phase opposition to $I_m$; the latter current flowing in the reverse direction with respect to the $I_m$ resulting from incident power on the line. Therefore the induced currents due to the reflected power which appears in resistor 36 will balance out and have no effect on the voltage drop developed across resistor 36 due to incident power. However, in resistor 37, as shown in Fig. 7, $I_m$ and $I_2$ which are due to the reflected power will both be 90° out of phase with respect to $I_r$, hence a voltage drop will be developed across resistor 37 as a function of the reflected power on the line. In other words, resistor 36 may be regarded as functioning to absorb incident energy from the transmission line, whereas resistor 37 acts to absorb reflected energy from the line.

Let it be assumed that resistor 36 in Fig. 2 is replaced by a device designed to have an equivalent impedance such as the input circuit of receiver 17 as in Fig. 1 or receiver 18, 19 or 20. It will then be apparent that the receiver connected to directional coupler 32 will be permitted to extract only incident energy from the line since reflected energy will be absorbed by resistor 37. It will also be appreciated that if resistor 36 were supplanted by a transmission means having a characteristic impedance equal to the impedance of resistor 36, said transmission means being connected to input of the receiver, only incident power derived from the transmission line will be fed to the receiver. It is this principle which enables the proper operation of the multiple distribution system set forth in connection with Fig. 1. Receiver 17, 18, 19 and 20 are connected to transmission line 13 by directional couplers 28, 29, 30 and 31, respectively, said receivers being responsive only to incident energy propagated on line 13.

Now let it be assumed, as illustrated in Fig. 3, wherein like components to those contained in Fig. 2 are represented by like reference numerals, that resistor 36 of Fig. 2 is replaced by a signal source 40 presenting the same impedance, such as either the output circuit of amplifier 14 in Fig. 1, or the output circuit of amplifier 15 or 16. In this case, because of the capacitative coupling between probe 35 and inner conductor 34, $I_1$ will flow on the line in the direction of terminating impedance 38 while $I_2$ will flow toward impedance 39. The current $I_m$ due to magnetic coupling between probe 35 and inner conductor 34 will flow in the direction of terminating impedance 38, hence $I_1$ and $I_m$ will be in phase coincidence but $I_2$ and $I_m$ will be in phase opposition. As a result energy on the line will travel unidirectionally toward terminating impedance 38. It is this principle which prevents interference and interaction between amplifiers 14, 15 and 16 in Fig. 1, said amplifier being coupled to transmission line 13 through directional couplers 25, 26, and 27, respectively. The directional couplers serve to introduce energy from the amplifiers to line 13 and to propagate said energy uni-directionally toward the receivers. The directional couplers also serve to bar reflected energy generated in the receivers from admittance to the amplifiers.

It is to be understood that arrows $I_1$,$I_2$, and $I_m$ in Figs. 2 and 3 indicate the direction of radio frequency current flow at a particular instant in the wave, that is for a particular polarity. However, when in the course of the wave motion the polarity reverses, the direction of $I_1$, $I_2$, $I_m$ will simultaneously reverse so that the same effective phase relations still exist.

Directional couplers 25 to 31 are substantially frequency insensitive over a wide range and do not introduce phase distortion. The desired values of the elements forming the directional couplers may readily be realized physically for high frequencies. For this reason the multiple distribution receiving system incorporating directional couplers is adapted for use in the high frequency channels presently assigned to television broadcasting.

Figures 8, 9:
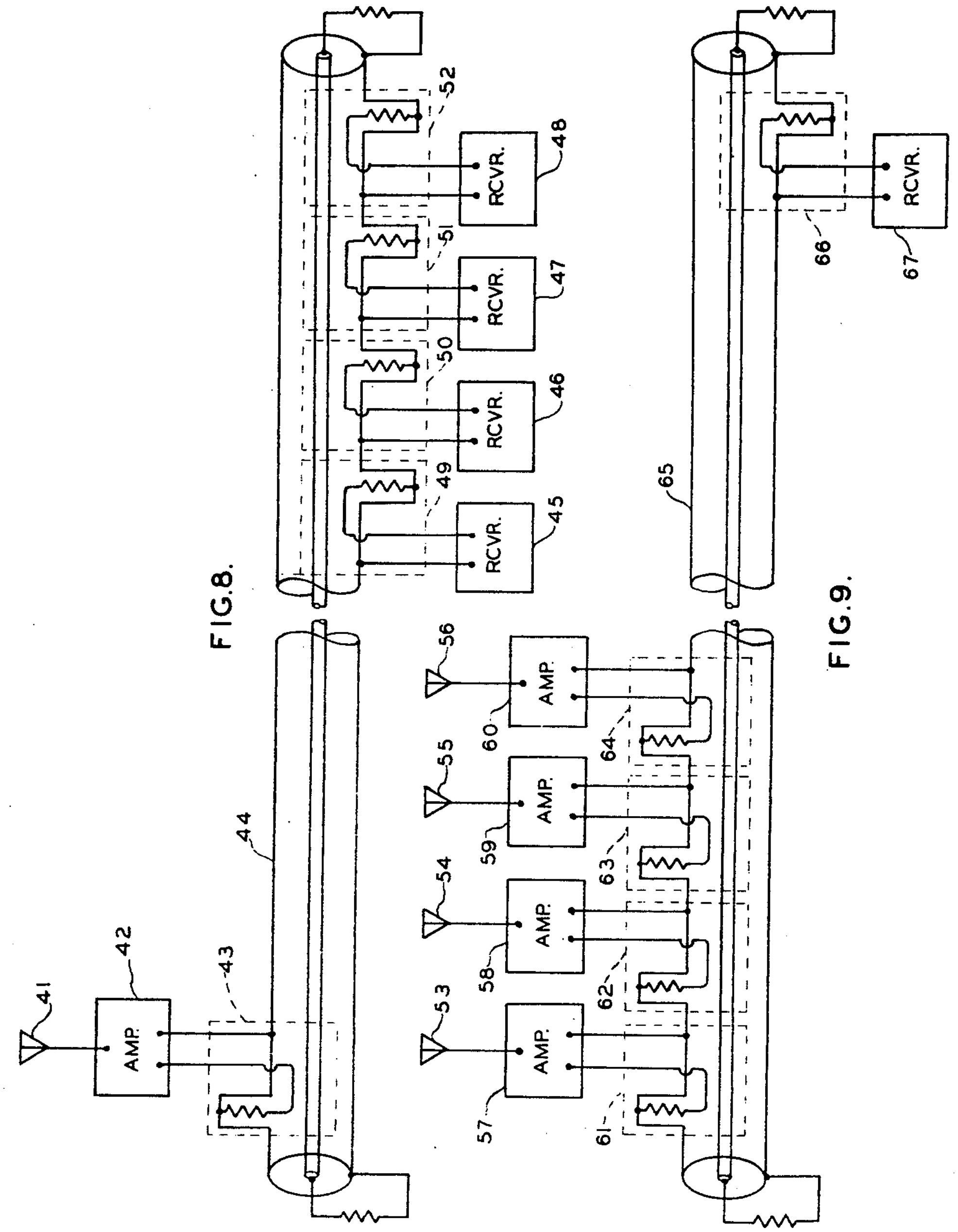
Figure 8 is a block diagram of another preferred embodiment of a receiving system.
Figure 9 is a block diagram of a third preferred embodiment of a receiving system in accordance with the invention.

Although the receiving system has been illustrated in Fig. 1 as including a group of three antennas connected through a common transmission line to a series of four receivers, it is to be understood that the invention is not limited to this particular arrangement, but may be operated successfully with a greater or lesser plurality of antenna and receiving units. For example, Fig. 8 illustrates in block form an arrangement entailing the use of a single antenna 41 whose output is amplified by a radio frequency amplifier 42 and applied through a directional coupler 43 to a transmission line 44. Coupled to transmission line 44 are four receivers 45, 46, 47 and 48, said receivers being coupled to line 44 through directional couplers 49, 50, 51 and 52, respectively. In another embodiment, shown in Fig. 9, a series of four antennas 53, 54, 55 and 56 are coupled through amplifiers 57, 58, 59 and 60 and directional couplers 61, 62, 63 and 64 respectively, to a common transmission line 65, the output of the line being fed through a directional coupler 66 to a single receiver 67.

While there has been shown and described what are presently considered preferred embodiments of the invention, it will be obvious that many changes and modifications may be made therein without departing from the essence of the invention and it is intended therefore in the accompanying claim to cover all such changes and modifications as fall within the scope and true spirit of the invention.

I claim:

1. A receiving system comprising antenna means for intercepting radio signals, at least one radio receiver, a transmission network for connecting said receiver to said antenna means, and directional coupling means interposed between said receiver and said transmission network, said coupling means serving to admit to said receiver only incident energy which is propagated on said transmission network in one given direction.

2. A multiple distribution receiving system comprising a group of antennas each adapted to intercept radio signals, a plurality of individual radio receivers, a common transmission network for connecting all of said antennas to all of said receivers, and directional coupling means interposed between said receivers and said transmission network for coupling each of said receivers thereto to derive energy therefrom, said coupling means serving to admit to said receivers only incident energy which is propagated on said transmission network in one given direction.

3. A multiple distribution receiving system comprising a goup of antennas each adapted to intercept radio signals, a group of radio frequency amplifiers respectively connected to each of said antennas, a plurality of individual radio receivers, a common transmission network for connecting the outputs of all of said amplifiers to the inputs of all of said receivers, directional coupling means interposed between each of said amplifiers and said transmission network, said directional coupling means serving to propagate energy uni-directionally on said transmission network, and directional coupling means interposed between each of said receivers and said transmission network, said directional coupling means serving to admit to said receivers only energy propagated on said transmission network in one direction.

4. A receiving system comprising a group of antennas each adapted to intercept radio signals, a group of radio frequency amplifiers respectively connected to each of said antennas, a plurality of individual receivers, a common transmission network for connecting the outputs of all of said amplifiers to the inputs of all of said receivers, a pair of impedances for respectively terminating each end of said transmission network in its matching impedance, directional coupling means interposed between each of said amplifiers and said transmission network, said directional coupling means serving to propagate energy uni-directionally on said transmission network, and directional coupling means interposed between each of said receivers and said transmission network, said directional coupling means serving to admit to said receivers only energy propagated on said transmission network in one direction.

5. A distribution receiving system comprising antenna means, receiver means, a transmission network connecting said antenna means and said receiver means, and a directional coupling means formed in said transmission network intermediate said antenna means and said receiver means, said coupling means rendering said receiving system insensitive to reflected energy on said transmission network.

6. A multiple distribution receiving system comprising antenna means, receiver means, and passive circuit means unidirectionally coupling said antenna means and said receiver means, said means serving to impress on said receiver means only energy transmitted thereto directly from said antenna means without any reflections.

7. The multiple distribution system as recited in claim 4, wherein said network is a coaxial transmission line and said directional coupling means interposed between each of said radio frequency amplifiers and said transmission line comprises a probe wire in proximity to the inner conductor of said transmission line, said probe being capacitively and inductively coupled to said inner conductor, an impedance element connecting one end of said probe wire to the outer conductor of said transmission line, and means for connecting the output circuit of said amplifier between the other end of said probe wire and said outer conductor, the impedance of said output circuit being equivalent in value to said impedance element.

8. The multiple distribution system as recited in claim 4, wherein said network is a coaxial transmission line and said directional coupling means interposed between each of said receivers and said transmission line comprises a probe wire in proximity to the inner conductor of said transmission line, said probe being capacitively and inductively coupled to said inner conductor, an impedance element connecting one end of said probe wire to the outer conductor of said transmission line, and means for connecting the input circuit of said receiver between the other end of said probe wire and said outer conductor, the impedance of said input circuit being equivalent in value to said impedance element.

9. A distribution system comprising a transmission network, a plurality of signal sources, a circuit coupling each of said signal sources to said transmission network, said circuit comprising directional coupler means connecting each signal source to said transmission network, a signal-utilizing network, a circuit connecting said signal-utilizing network to said transmission network, said last-named circuit comprising a directional coupler for feeding from said transmission network to said signal-utilizing network only incident energy propagated along said transmission network in a single predetermined direction.

10. A multiple distribution system comprising a transmission network, impedance matching means for terminating said transmission network, a plurality of signal sources, a directional coupler connecting each of said signal sources to said transmission network, a plurality of signal-transducing means, a circuit connecting each of said signal-transducing means to said transmission network, said last-named circuit comprising a directional coupler for feeding from said transmission network to said signal-transducing means only incident energy propagated along said transmission network in a single predetermined direction.

11. A multiple distribution system comprising a transmission network, impedance matching

EXAMINER means for terminating said transmission network, at least one signal source coupled to said transmission network, a plurality of signal-utilizing networks, circuits connecting to latter networks to said transmission network, each of said last-named circuits comprising a directional coupler for feeding from said transmission network to said signal-utilizing networks only incident energy propagated along said transmission network in a single predetermined direction.

12. A multiple distribution system comprising a transmission network, at least one antenna coupled to said transmission network, a plurality of receivers, circuits connecting said receivers to said transmission network, each of said circuits comprising a directional coupler for feeding from said transmission network to said receivers only incident energy propagated along said network in a given driection while blocking from said receivers energy propagated in the opposite direction along said network.

13. A multiple distribution system comprising a transmission network, impedance matching means for terminating said transmission network, a plurality of antennas, directional coupler means for feeding the outputs of said antennas to said transmission network, a plurality of receivers, circuits connecting said receivers to said transmission network, each of said last-named circuits comprising a directional coupler for feeding from said transmission networks to said receivers only incident energy propagated along said network in a given direction while blocking from said receivers energy propagated in the opposite direction along said network.

14. A multiple distribution system comprising a transmission line, impedance matching means terminating each end of said transmission line, at least one antenna, a circuit coupling said antenna to said transmission line near one end thereof, said circuit comprising directional coupler means feeding the output of said antenna to said transmission line, a plurality of receivers, circuits connecting said receivers to said transmission line means at different points spaced from said one end, said circuits comprising directional couplers for feeding from said transmission line means to said receivers only incident energy propagated along said line in one direction while blocking energy propagated in the opposite direction along said line.

15. A multiple distribution system comprising a transmission line, impedance matching means terminating each end of said transmission line, at least one antenna, a circuit coupling said antenna to said transmission line, said circuit comprising an amplifier, a plurality of receivers, circuits connecting said receivers to said transmission line, said last-named circuits comprising directional couplers for feeding from said transmission line to said receivers only incident energy propagated along said line in one direction while blocking energy propagated in the opposite direction along said line.

16. A multiple distribution system comprising a transmission line, impedance matching means terminating each end of said transmission line, a plurality of antenna, circuits coupling said antennas to spaced points on said transmission line, each of said circuits comprising an amplifier connected to the antenna and directional coupler means feeding the output of said amplifier to said transmission line, a plurality of receivers, circuits connecting said receivers to said transmission line at spaced points thereof, said circuits comprising directional couplers for feeding from said transmission line to said receivers only incident energy propagated along said line in one direction while blocking energy propagated in the opposite direction along said line.

WILLIAM J. JONES.

REFERENCES CITED

The following references are of record in the file of this patent:

UNITED STATES PATENTS

| Number | Name | Date |
|---|---|---|
| 1,976,910 | Amy et al. | Oct. 16, 1934 |
| 2,000,190 | Rettenmeyer | May 7, 1935 |
| 2,094,360 | Landon | Sept. 28, 1937 |
| 2,129,075 | Weinberger | Sept. 6, 1938 |
| 2,148,098 | Bowman-Manifold | Feb. 21, 1939 |
| 2,203,746 | Roosenstein | June 11, 1940 |
| 2,229,043 | Butler | Jan. 21, 1941 |
| 2,394,917 | Kallmann | Feb. 12, 1946 |
| 2,401,205 | Usselman | May 28, 1946 |
| 2,408,032 | Beck | Sept. 24, 1946 |
| 2,408,271 | Rigrod et al. | Sept. 24, 1946 |
| 2,423,416 | Sontheimer et al. | July 1, 1947 |

OTHER REFERENCES

Radio Engineering, Terman, 3d ed., 1947, sec. 4—2, paragraph 1, at page 78.